United States Patent
Pon et al.

(10) Patent No.: US 10,123,295 B2
(45) Date of Patent: Nov. 6, 2018

(54) METHOD AND APPARATUS FOR MOBILE POSITIONING OPTIMIZATION WITH REPORTING

(71) Applicant: QUALCOMM Incorporated, San Diego, CA (US)

(72) Inventors: Rayman Pon, Cupertino, CA (US); Ju-Yong Do, Palo Alto, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/866,777

(22) Filed: Sep. 25, 2015

(65) Prior Publication Data

US 2017/0094631 A1  Mar. 30, 2017

(51) Int. Cl.
*H04W 64/00* (2009.01)
*G01S 5/00* (2006.01)
*G01S 5/02* (2010.01)

(52) U.S. Cl.
CPC ........... *H04W 64/00* (2013.01); *G01S 5/0018* (2013.01); *G01S 5/021* (2013.01); *G01S 5/0236* (2013.01); *G01S 5/0242* (2013.01)

(58) Field of Classification Search
CPC . H04W 64/00; H04W 64/003; H04W 64/006; H04W 4/04; H04W 4/023; H04W 88/02; H04W 64/04; G01S 5/0242; G01S 5/0252
USPC ............................... 455/404.2, 456.1, 456.2
See application file for complete search history.

(56) References Cited

U.S. PATENT DOCUMENTS

| | | | |
|---|---|---|---|
| 6,751,443 B2 | 6/2004 | Haymes et al. | |
| 7,532,894 B1 * | 5/2009 | Muhonen | H04W 8/10 455/456.1 |
| 7,595,754 B2 * | 9/2009 | Mehta | G01S 5/0205 342/357.31 |
| 8,509,761 B2 * | 8/2013 | Krinsky | H04W 24/08 455/414.1 |
| 2003/0125046 A1 | 7/2003 | Wyatt et al. | |

(Continued)

OTHER PUBLICATIONS

International Search Report and Written Opinion—PCT/US2016/048744—ISA/EPO—dated Dec. 7, 2016.

*Primary Examiner* — Julio Perez
(74) *Attorney, Agent, or Firm* — Thien T. Nguyen

(57) ABSTRACT

Method, device, computer program product, and apparatus to enable mobile device position optimization and reporting are described. Signals provided by a plurality of base transceiver stations (BTS) are received to determine a BTS-based position of the mobile device. A reference position of the mobile device is determined. A range measurement with respect to a target BTS is determined. In one aspect, one or more unreliable BTSs may be detected and reported based on a positioning measurement quality, a range measurement quality, or combinations thereof. In one aspect, the positioning measurement quality is determined based on a difference between the reference position of the mobile device and the BTS-based position of the mobile device. In one aspect, the range measurement quality is determined based on a difference between a measured range/distance and a reference/expected range/distance.

37 Claims, 6 Drawing Sheets

(56) References Cited

U.S. PATENT DOCUMENTS

| | | | |
|---|---|---|---|
| 2005/0136911 A1* | 6/2005 | Csapo | H04W 16/18 455/423 |
| 2009/0264136 A1* | 10/2009 | Ische | G01S 5/02 455/456.1 |
| 2011/0065457 A1 | 3/2011 | Moeglein et al. | |
| 2012/0050098 A1 | 3/2012 | Kuehnel et al. | |
| 2012/0196615 A1* | 8/2012 | Edge | G01S 5/0036 455/456.1 |
| 2013/0324163 A1* | 12/2013 | Werner | G01S 5/0236 455/456.6 |
| 2014/0159952 A1 | 6/2014 | Fitzgerald et al. | |
| 2014/0162589 A1* | 6/2014 | Gupta | H04W 64/003 455/404.2 |
| 2014/0213282 A1* | 7/2014 | Chin | H04W 24/00 455/456.1 |
| 2014/0274113 A1 | 9/2014 | Teed-Gillen et al. | |
| 2014/0301181 A1* | 10/2014 | Suryavanshi | H04L 65/80 370/218 |
| 2014/0370918 A1 | 12/2014 | Moeglein et al. | |
| 2015/0004997 A1 | 1/2015 | Gao et al. | |
| 2015/0304815 A1* | 10/2015 | Ghose | H04W 4/023 455/456.3 |
| 2015/0350847 A1* | 12/2015 | Chao | H04W 4/021 455/457 |
| 2016/0142875 A1* | 5/2016 | Awoniyi-Oteri | H04W 4/023 455/456.2 |

\* cited by examiner

METHOD AND APPARATUS FOR MOBILE POSITIONING OPTIMIZATION WITH REPORTING

FIELD

The subject matter disclosed herein relates generally to mobile positioning, and more specifically to positioning optimization with reporting.

BACKGROUND

Mobile device/station position may be estimated from data gathered and processed from various systems. One positioning system in use by some mobile devices is the global navigation satellite system (GNSS). Mobile devices may also utilize terrestrial wireless communications systems, such as WiFi access points or Cell towers/base transceiver stations (BTS).

A position estimate, which may also be referred to as a position "fix", for a mobile device may be obtained based at least in part on distances or ranges from the mobile device to transmitters or emitters, and also based at least in part on the locations of the one or more transmitters. The transmitters may comprise satellites in the case of GNSS, and/or terrestrial wireless transmitters (e.g., BTSs) in the case of a cellular communications system, for example. The locations of the wireless transmitters may be ascertained, in at least some cases, from information provided by the wireless transmitters themselves and/or from information stored in assistance data, for example.

With regard to device position determination from BTSs however, some BTS systems may not be adequately maintained (e.g., unstable clocks) or may be infrequently updated to provide accurate mobile device positioning. For example, BTS maintenance engineers may focus on voice or data throughput or reliability, with little to no emphasis on maintenance or optimization for mobile device positioning. Some problems when using BTSs for positioning may be more pronounced in areas where the BTS infrastructure is sparse or not fully developed. Therefore, discovery of misconfigured or unreliable BTSs may typically occur, if errors are detected at all, after mobile device user complaints are received by a cellular carrier or device manufacturer. BTS positioning errors may persist long after their first occurrence.

BRIEF SUMMARY

Figure 1:
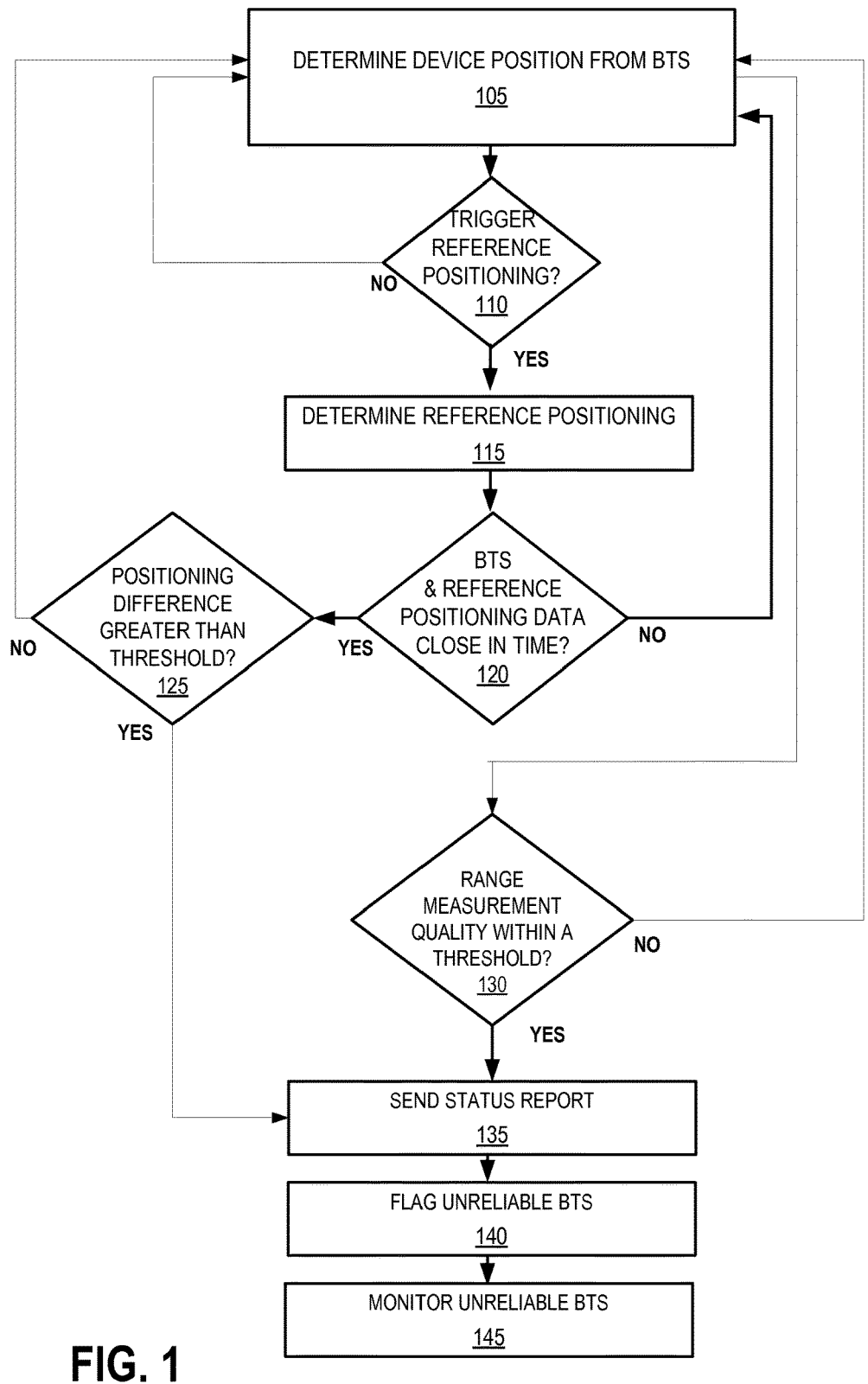
FIG. 1 is a flow diagram illustrating a method for a device to implement one embodiment of Mobile Positioning Optimization with Reporting (MPOR)

Some embodiments discussed herein provide for detection and reporting of unreliable base transceiver stations (BTSs) within a system or environment. Mobile devices, operating independently, can detect unreliable positioning data from one or more BTSs and provide (e.g., to a server or other device) a status report. The mobile device may choose to ignore, exclude, remove, and/or report unreliable BTSs. In some embodiments, a server may receive the status report and generate assistance data based on the reportedly unreliable BTSs.

In one embodiment, a method for position monitoring and reporting by a mobile device includes: determining a reference position of the mobile device; receiving signals from a plurality of BTSs; determining one or more of: a position of the mobile device based on the received signals from the plurality of BTSs, a position of a target BTS, or a combination thereof; detecting one or more unreliable BTSs based on one or more of: mobile device positioning measurement quality based on the plurality of BTSs, range measurement quality, or a combination thereof; providing, in response to detecting the one or more unreliable BTS, a status report including one or more of: BTS data, mobile device data, or a combination thereof.

In another embodiment, mobile device to perform position monitoring and reporting includes memory and a processor configured to: determine a reference position of the mobile device; receive signals from a plurality of base transceiver stations (BTSs); determine one or more of: a position of the mobile device based on the received signals from the plurality of BTSs, a position of a target BTS, or a combination thereof; detect one or more unreliable BTSs based on one or more of: mobile device positioning measurement quality based on the plurality of BTSs, range measurement quality, or a combination thereof; provide, in response to detecting the one or more unreliable BTS, a status report including one or more of: BTS data, mobile device data, or a combination thereof.

In another embodiment, a machine readable non-transitory storage medium includes program instructions that are executable by a processor to: determine a reference position of the mobile device; receive signals from a plurality of BTSs; determine one or more of: a position of the mobile device based on the received signals from the plurality of BTSs, a position of a target BTS, or a combination thereof; detect one or more unreliable BTSs based on one or more of: mobile device positioning measurement quality based on the plurality of BTSs, range measurement quality, or a combination thereof; provide, in response to detecting the one or more unreliable BTS, a status report including one or more of: BTS data, mobile device data, or a combination thereof.

In another embodiment, an apparatus for position monitoring and reporting by of a mobile device includes: means for determining a reference position of the mobile device; receiving signals from a plurality of base transceiver stations (BTSs); means for determining one or more of: a position of the mobile device based on the received signals from the plurality of BTSs, a position of a target BTS, or a combination thereof; means for detecting one or more unreliable BTSs based on one or more of: mobile device positioning measurement quality based on the plurality of BTSs, range measurement quality, or a combination thereof; means for providing, in response to detecting the one or more unreliable BTS, a status report including one or more of: BTS data, mobile device data, or a combination thereof.

In another embodiment, server to provide assistance data includes memory and a processor configured to: receive, from a mobile device, a status report indicating one or more BTSs are potentially unreliable for mobile device positioning; determine, in response to the receipt of the status report, whether to classify the one or more BTSs as unreliable according to a confidence threshold; classify, in response to the determination that the one or more unreliable BTSs meet a confidence threshold, the one or more BTSs as unreliable for mobile device positioning; and update mobile device assistance data according to the one or more BTSs classified as unreliable for mobile device positioning.

In one embodiment, a method for providing assistance data includes: receiving, from a mobile device, a status report indicating one or more BTSs are potentially unreliable for mobile device positioning; determining, in response to receiving the status report, whether to classify the one or more BTSs as unreliable according to a confidence threshold; classifying, in response to determining the one or more unreliable BTSs meet a confidence threshold, the one or more BTSs as unreliable for mobile device positioning; and updating mobile device assistance data according to the one or more BTSs classified as unreliable for mobile device positioning.

The above and other embodiments, objects, and features of the present disclosure will become apparent from the following description of various embodiments, given in conjunction with the accompanying drawings.

DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Position of a mobile device may be estimated based on information gathered from various systems, including GNSS, WiFi, and cellular communications systems, for example. A position estimate for a mobile device may be obtained based at least in part on distances or ranges from the mobile device to one or more transmitters, and also may be based at least in part on the locations of the one or more transmitters. Transmitters may be satellites in the case of GNSS, and/or terrestrial wireless transmitters, such as BTSs (i.e., base station or base station transceiver (BST)) or cellular towers in the case of a cellular communications system. With regards to local area networks, the transmitters may be WiFi access points or beacons. The locations of the wireless transmitters may be ascertained, in at least some cases, from information provided by the wireless transmitters themselves and/or from information from assistance data (e.g., stored and distributed by a server).

However, in at least some cases, mobile position relative to a transmitter may not be accurately determined from the signals or data provided by wireless transmitters. For example, a BTS may be improperly configured or broadcast misleading positioning data to mobile devices within range. A BTS may also report a position in the center of a coverage area for the BTS rather than the actual location of the wireless transmitter's antenna. As another example, the reported position may refer to the position of the antenna, but may be inaccurate due to, for example, human and/or machine errors in calculating and/or storing the transmitter location. Inaccuracies may further result from deliberate misreporting of a position with the intent of spoofing a position location system, or other problems. Furthermore, a BTS's broadcast signal may be hidden or obscured by landmarks near the BTS. Therefore, although a BTS may be properly configured, mobile devices receiving positioning signals from the BTS may be misled as to the range measurements from the BTS.

In one embodiment, in accordance with the Mobile Positioning Optimization with Reporting (MPOR) techniques as described herein, a mobile device (e.g., device 500 as described in greater detail below with regards to FIG. 5) monitors the quality of positioning data derived from radio frequency (RF) signals to detect and optimize for errors within a positioning system. For example, the device performing MPOR may detect errors originating from BTS based measurements (e.g., Time of Arrival (TOA), and ranging measurements). In one embodiment, a mobile device or a number of mobile devices working together in a crowdsourcing system detects problematic BTSs by comparing measurements from other BTSs. In other embodiments, the device compares the BTS based results to a reference position obtained by other potentially more reliable or accurate means. For example, the device may obtain reference positioning results may from GNSS (e.g., GPS), local WiFi, device sensors (e.g., pedestrian dead reckoning), user provided position (e.g., through check ins or interactive mobile applications), or other positioning techniques as well as a combination of any of the previously mentioned techniques. For power intensive positioning systems, such as GNSS, the mobile device may synchronize the BTS positioning comparison with already scheduled GNSS positioning data. For example, when a user activates their GPS for mapping or positioning, the device can trigger BTS positioning so that two data points (e.g., mobile device positions) at approximately the same time/location can be compared with minimal additional overhead on the device. In some embodiments, when the device determines a high likelihood (e.g., within a configurable threshold) that BTS data is erroneous, the device may recommend that the mobile device determine position from a different (e.g., secondary) positioning system source.

In response to discovering a disparity between positioning results, each mobile device performing MPOR techniques can send a BTS report to a server. In some embodiments, the server may compile and process data received in the BTS report (e.g., to provide updated assistance data to mobile devices). The BTS report may contain ranging data, or raw measurements from nearby BTS recorded by each mobile device (e.g., each mobile device in a field of mobile devices in a crowdsourcing environment). Each mobile device may also report BTS ID and mobile position at the time of the BTS fix or measurements. The server can maintain a global database of BTS reliability results, and mark, flag, or otherwise tag problematic/unreliable BTSs. Mobile device crowdsourcing of BTS data can speed up the discovery of the most effective BTSs and optimize positioning using BTS by detecting and filtering out the less effective BTSs.

FIG. 1 is a flow diagram illustrating a method for a device to implement one embodiment of MPOR. At block 105, a mobile device (e.g., device 500) determines the mobile device's position from received BTS signals (also referred to herein as simply BTS positioning). In some embodiments, a user or application (e.g., an application local to the mobile device or an application communicating with the mobile device) triggers BTS positioning by the mobile device. In other embodiments, the BTS positioning runs at all times, or at configured intervals. Mobile positioning using BTS may measure BTS signals within the region around the mobile device to determine a relative position from the respective BTS. For example, BTS signals may be RF signals with properties such as received signal power level (e.g., RSSI), time delay (e.g., RTT), Time of Arrival (TOA), frequency, and/or delay-spread.

In one embodiment, a mobile device measures, from the monitored signals provided by a plurality of BTSs (e.g., nearby BTSs within communication range to the mobile device), a range between the mobile device and each of the plurality of BTSs, determining a position of each of the plurality of BTSs, calculating the mobile device position according to: the range between the mobile device and each BTS, and position of each of the plurality of BTSs. For example, each BTS may have an associated location (e.g., a physical presence where a BTS exists or is installed), such as a location provided by a server in the form of positioning assistance data. By calculating the relative mobile device position from each of three or more BTSs, the mobile device can triangulate its position (i.e., BTS based position). In some embodiments, a mobile device triggers BTS positioning in response to one or more of: the determining of the reference position (e.g., as described in greater detail below), a self-determination by the mobile device that the accuracy of the mobile device's BTS positioning may be unreliable, a user request to verify accuracy of the mobile device's BTS positioning, a server request to verify accuracy of the mobile device's BTS positioning, or any combination thereof.

At block 110, the mobile device determines whether to trigger reference positioning. For example, the mobile device may follow a planned or opportunistic method of investigating and reporting potential BTS positioning issues. In one embodiment, whether the mobile device triggers additional or reference positioning is determined according to the current/recent positioning from BTSs. For example, a mobile device can detect unreliable or inconsistent BTSs in response to performing range measurements from the current mobile device position to each nearby BTS. The mobile device can compare range measurements from each BTS to detect an unreliable or inconsistent BTSs within the environment. For example, when performing trilateralization, a majority of the BTSs should agree on a distance of the mobile device given the position of the BTS. When one or more BTS do not agree with the distance determination of other BTSs the particular BTS may be flagged as potentially problematic, inconsistent, or unreliable.

In some embodiments, a mobile device utilizes a mobile device reference position instead of or in addition to comparing range measurements for each of a plurality of BTSs. For example, the mobile device can trigger determination of a mobile device reference position to enable distance measurement from the mobile device reference position to the position of a target/test BTS. The mobile device reference position may be determined from GNSS, WiFi based positioning, sensor based positioning, or user input for current position. The mobile device reference position may be used to check the accuracy of suspect (e.g., potentially erroneous or inconsistent) BTS positioning results and/or single distance calculations to a BTS.

In some embodiments, the ability of the mobile device to trigger additional/reference positioning depends on a configuration or setting for managing one or more of: privacy, power savings, overall activity allowance, or any combination thereof on the mobile device. For example, a user may only allow the mobile device to trigger additional positioning processes at a defined or configurable frequency/rate. In some cases users may prefer to operate their mobile device in a low power mode such that GNSS or other relatively high power positioning is not triggered solely for BTS positioning verification. In some embodiments, when authorization or settings for active triggering of reference positioning is low or unavailable, the mobile device can still have access to reference positioning if the reference positioning was independently triggered and results are available within a threshold time window. For example, the user may not allow BTS positioning verification to trigger reference GNSS positioning requests, however the user may have recently requested GNSS positioning in a separate process or application independent of any request for BTS positioning. Therefore, a device may reference the results from the independently triggered or previously determined reference position to determine whether the user is likely in the same position that the reference position was determined. For example, at time T1, a user may independently access (e.g., regardless of device status) an application or program which requests a GNSS based position. At time T2, the user may request BTS positioning. If T1 and T2 are within a threshold configurable time period/window, the GNSS based position obtained at T1 may be used to verify the positioning from BTSs determined at time T2. In other embodiments, a mobile device may use low power dead reckoning from a GNSS based position, or any number of positioning combinations for a reference position. If reference positioning is triggered, the embodiment continues to determine reference positioning at block 115, otherwise the embodiment continues to determine BTS positioning at block 105.

At block 120, the mobile device determines whether BTS positioning measurements and reference position results are close in time. For example, when reference positioning is triggered sporadically or without regard to timing of the BTS positioning, the two positioning results may yield different positions due to data points obtained at different points in time while the device is traveling. Therefore, the mobile device can determine that the reference position and the BTS position are close enough in time such that they should indicate the same position of the mobile device if both positions are accurate. If the time difference is above a threshold, the embodiment may return to block 105 to continue BTS positioning. Otherwise, if the time stamps indicate the position results should be the same or similar, the embodiment continues to block 125. In some embodiments, the mobile device can utilize an accelerometer or other sensor(s) to estimate distance or movement when determining the time difference threshold. For example, if the mobile device is traveling at high speed the threshold may be less than if the mobile device is stationary.

At block 125, the embodiment determines whether the positioning difference between the position determined from BTS signals and the reference position are greater than a configurable threshold. For example, given the accuracy of the reference position (e.g., GPS may be reliable within a certain radius, vs. WiFi may have a different accuracy radius), the difference between a position from BTS signals and the reference position may be within an acceptable error range. In one embodiment, mobile device can report an unreliable BTS location to the server when the difference between the BTS positioning and the reference position is greater than a configurable threshold. In some embodiments, the mobile device reports a BTS as unreliable or inconsistent when BTS based measurements are not consistently within a threshold difference of the reference position.

At block 130, the embodiment determines whether range measurement quality is within a threshold. In one embodiment, range measurement quality is considered bad (or outside of a threshold acceptable range) when a range measurement is beyond a threshold amount from an expected value. In one embodiment, the range measurement is obtained from measuring the TOA (time of arrival) while taking into account the amount of BTS delay error (e.g., in the BTS as it transmits the BTS signal), and the measured group delay delta (e.g., in the mobile device between the cell signal and the GNSS signal). The group delay is accommodated for when measuring the BTS signal in GNSS time (e.g., GPS) within a device. Ideally the BTS transmits the BTS signal exactly synchronized with the GNSS time as it exits the transmitting antenna. Therefore, the TOA corrected by the BTS delay error and the group delay delta in the mobile device provides the range according to the sub-millisecond portion of the TOA. Zero milliseconds represents a zero/no delay because this is the point where the BTS signal is synchronized to GNSS time at the transmitting antenna. The sub-millisecond portion of the TOA value may be converted to a range or measured distance (e.g., range measurement based distance).

A reference distance between the mobile device and a target BTS may be computed by taking the difference in position (e.g., map coordinate position) from the target BTS position to current reference device position. A target BTS position may be received from a server (e.g., as part of positioning assistance data), and a reference position of the mobile device may be determined from GNSS, user input, PDR, or other methods. Therefore, the reference distance between the mobile device and a target BTS minus the estimated/expected range (distance) should be within some limit to be reasonable and of good quality. If beyond some error limit, then the quality is bad.

For example, for one or more BTSs, the mobile device may use BTS position and BTS clock bias from a server to determine a range (e.g., distance based on radio frequency measurements) between a target BTS and the mobile device. The range between the BTS and the mobile device may be compared to the expected/calculated distance given the reference position of the mobile device and the BTS position (e.g., as indicated from the BTS itself or reported by a server). If the difference between the range and the expected distance is greater than a configurable range measurement quality threshold the BTS may be flagged for potential BTS positioning issues and inconsistencies. The threshold may be configured according to percentage difference or physical distance. For example, if a BTS is located 300 feet from a mobile device at a particular reference position, but range indicates 500 feet between the device, then the difference is 200 feet. A difference of 200 feet may be greater than a recommended accuracy distance, or recommended error difference percentage such that the BTS may be identified as potentially unreliable and there may be potential problems with using the particular BTS in BTS positioning.

In one embodiment, the range measurement quality threshold is a global value (e.g. "x" number of meters or other configurable distance value) based on an expected global error range. The expected global error range may be pre-calculated offline and pre-programmed to a mobile device or may be evaluated and updated at a server continuously and sent to the mobile device for verification. In some embodiments, the range measurement quality threshold is a local threshold per network (or per BTS) that may be updated or maintained by a server. In some embodiments, a local threshold provides for effective management of different levels acceptable of ranging errors among different networks. For example, some cell carriers may have different expected range errors associated with their BTSs or may have more stable clocks in their respective BTSs than other carriers and the local threshold may reflect this variation.

In some embodiments, measurement quality includes one or more of: measurement of self-consistency, consistency compared to peers, and/or consistency with regards to a reference position. Self-consistency may be determined by checking measurement variation over time. If there is a significant change (e.g., beyond a configurable threshold value) in a short time (e.g., also with configurable amount of time), the BTS may be marked as unreliable. For example, a 50 meter change in 1 second may be unlikely because a user typically can't move at that rate of speed/distance in such a short time period. Consistency with peers (e.g., other BTS within a network or area) can be checked based on the position estimation residual error, which represents the discrepancy of a BTS's measurement with the estimated user/device position. With regards to position trilaterlation, if a measurement is consistent with the estimated user/device position, which may be built upon consensus of all measurements, the distance to the estimated position should match closely with the measurement. Larger discrepancies in estimated position and the measurement may indicate inconsistency of this measurement compared to the rest of measurements (e.g., BTS may be unreliable).

In some embodiments, range measurements are compared to the distance from reference user location (e.g., reference position) instead of or in addition to the estimated user/device location from BTS measurements (e.g., BTS positioning) as described above. A large discrepancy between a determined range (distance) compared to a reference distance (e.g., distance between the reference position of the mobile device and the BTS position) may indicate disagreement with the reference position (e.g., BTS may be unreliable). In some embodiments, range errors may be detected by what may be referred to as a residual error which equals [TOA measurement−distance (i.e., the difference in position between the BTS position and mobile device reference position)−mobile clock bias].

In some embodiments, the amount of discrepancy or difference in range or positioning measurements that results in a device classifying a BTS as unreliable may be a configurable setting or threshold. For example, a range to reference positioning or mobile device BTS positioning error of 10 feet may be acceptable but a difference of 200 feet may be unacceptable. Depending on the configured threshold, a positioning result or range to reference positioning determination may result in classifying a particular BTS as unreliable (e.g., producing/effecting erroneous measurements by mobile devices).

At block 135, the mobile device sends a status report. For example, the mobile device status report can include mobile device reference position, position determined from BTS, list of BTSs (e.g., one or more BTSs with suspected issues, also referred to as the "unreliable", "inconsistent", "suspect", "bad", "error prone", or otherwise designated BTSs), raw measurements received by the mobile device from the BTS, and other information. Additionally, the report may include one or more of: estimated BTS measurement errors (e.g., a first BTS has 100 meter measurement error, a second BTS has 300 meter error, etc.), solution residual error, or receiver autonomous integrity monitoring (RAIM) result. RAIM detects and possibly corrects measurement errors based on various statistical testing such as chi-square test, parity vector, horizontal protection limit (HPL). These statistics and RAIM outputs can be uploaded or sent to a server to provide additional information as to what happened during position estimation.

At block 140, the embodiment flags unreliable BTSs. In some embodiments, the BTS may have a reliability rating that is decreased when additional measurements from the BTS are received. In other embodiments, the BTS is considered reliable until a threshold number of unreliable BTS positioning results are detected.

At block 145, the embodiment monitors unreliable BTSs. In response to identifying a particular BTS as unreliable the mobile device may exclude, ignore, or otherwise remove the particular BTS from considering during future (or current) BTS positioning. The mobile device may also send an identifier of one or more particular BTS to a server for recordkeeping and adjustment of assistance data. In some embodiments, each mobile device may persistently maintain a BTS quality list to avoid using bad BTS. In some embodiments, in response to detecting a particular BTS is unreliable, the mobile device may increase frequency of monitoring signals (e.g., by the mobile device) from the particular BTS when in the monitoring device is within range of the BTS. In some embodiments, in response to detecting a particular BTS as unreliable, the mobile device sends a representation of the monitored signals from the particular BTS to the server. For example, the mobile device may send (e.g., to a server or other mobile device) raw signal measurements signals such as RSSI, RTT, TOA, frequency, and/or delay-spread. In some embodiments, the mobile device may process the raw signal measurements into alternate units of measurement or other representative formats that include a portion or all of the original monitored data. For example, the mobile device may process one or more raw signal measurements into range or distance measurements.

Figure 2:
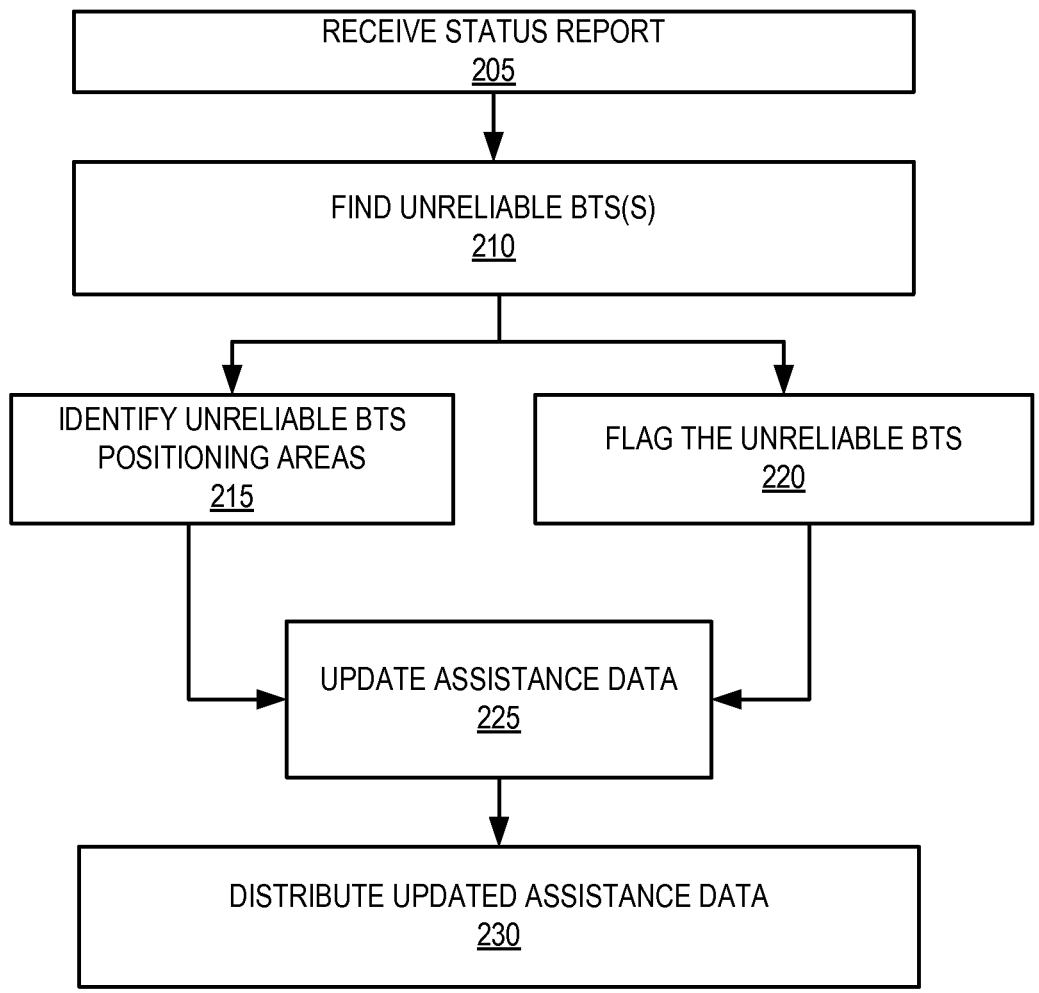
FIG. 2 is a flow diagram illustrating a method for a server to implement one embodiment of MPOR.

FIG. 2 is a flow diagram illustrating a method for a server to implement one embodiment of MPOR. At block 205, the server receives a status report (e.g. BTS status report). For example, a plurality of mobile devices may detect unreliable BTS and report analytics and measurements from the BTS environment and send the report to one or more servers.

At block 210, the server finds unreliable BTSs. For example, identifiers of BTSs providing erroneous positioning signals may be reported by one or more mobile devices, or the raw measurements received by the mobile device may be sent to the server for processing and determination as to which BTS in the environment is providing erroneous positioning assistance. In some embodiments, BTS reports include "good" BTSs as well, and may also be used to find the most reliable BTSs or highest performing BTSs in an area. The server may try position estimation based on the raw measurement. Then, the server can calculate mobile's estimated position and find out any issue in the measurements and corresponding BTSs. In other words, the server can emulate what mobiles does exactly based on the reported measurements and investigate the problem on behalf of the mobile.

At block 215, the server identifies unreliable BTS positioning areas. In one embodiment, the server can identify areas with a high ratio of positioning troubles reported by mobile devices. For example, a downtown area with high multipath, or a highway area that suffers from bad geometry (e.g., collinear set of BTSs). The server can identify a recommended set of BTSs to use in a particular area (e.g., a whitelist) and/or can un-recommend particular BTS (e.g., a blacklist) For example, the blacklist may include unreliable BTSs in an area that may cause problems for mobile device positioning (e.g., BTS in an area with many blocking objects such as a mountainous area or urban downtowns with many skyscrapers would cause unreliable positioning persistently). The server may generate a trouble zone map with recommendations of which BTS to use for positioning within the area, or expected positioning reliability uncertainty. In some embodiments, each mobile device can check whether they are within a defined trouble zone while utilizing BTS positioning. If a mobile device is in an unreliable zone, they may switch to a different positioning scheme, such as GNSS, WiFi based positioning, or other systems.

At block 220, the embodiment flags the unreliable BTS(s). For example, the server may mark unreliable BTSs for identification during creation of assistance data. In some embodiments, the server determines a reliability rating for each BTS in an area and consider the reliability when calculating assistance data to provide to mobile devices. In some embodiments, the BTS may have a reliability rating that is decreased when additional BTS reports for the BTS are received. In other embodiments, the BTS is considered reliable until a threshold number of reports claiming the BTS is unreliable are received, then the BTS is flagged as unreliable.

At block 225, the server updates assistance data. For example, the server can process the received data from multiple mobile devices to adjust which BTS to include in the assistance data. In one embodiment, the server removes unreliable BTSs when a number of error reports for the BTS are received. For example, in response to hitting a threshold number of errors for a particular BTS, the server in providing assistance data, may ignore the unreliable BTS. In some embodiments, the server can correct the assistance data to reflect the status report received from one or more mobile devices. For example, the server may re-estimate the antenna location of a BTS. In some embodiments, re-estimation is triggered and can be done either based on measurements in the BTS report or based on accumulated crowdsourcing data. If triggered with accumulated data, the server can divide the data in time bins and conduct estimation over multiple bins of data separately and cross check if the result is consistent to find out if the BTS has been moved or its clock offset has changed. In some embodiments, the server augments a BTS with expected error per serving cell so that the mobile device can select an appropriate positioning method (e.g., GNSS or BTS positioning). Bad BTS may be either removed, tagged with an uncertainty flag, tagged with a request for more frequent crowdsourcing, or with suggested positioning methods. In particular, if there are too few good BTS within the area, the server may recommend using an alternate positioning method when decreased positioning performance is expected.

At block 230, the server distributes the updated assistance data. For example, when a mobile device requests assistance data for a particular environment, the server may provide assistance data with unreliable BTSs removed or flagged as potentially unreliable within the assistance data.

Figure 3A:
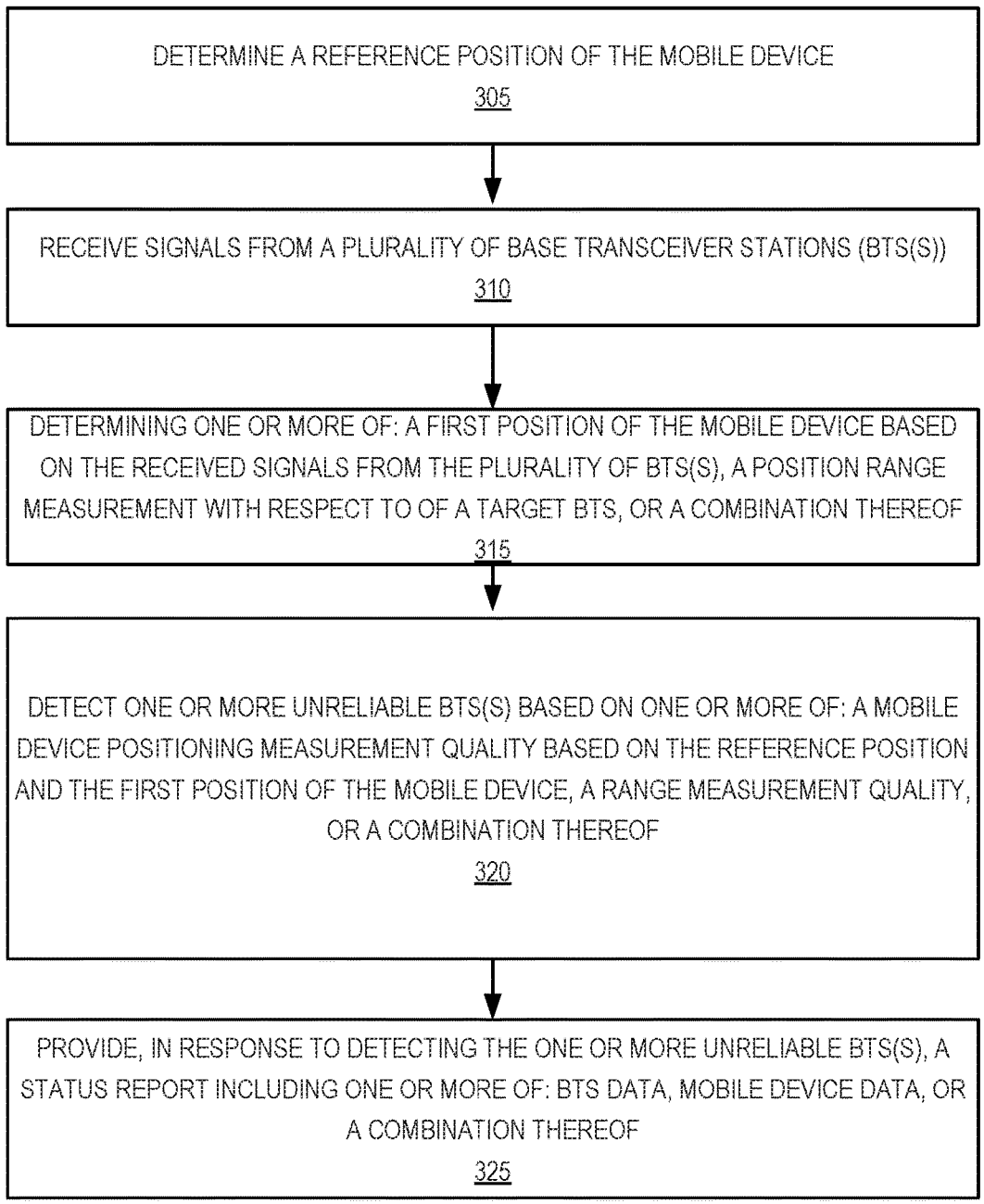
FIG. 3A is a flow diagram illustrating a method for a device to implement another embodiment of MPOR.

FIG. 3A is a flow diagram illustrating a method for a device to implement another embodiment of MPOR. At block 305 the device, determines a reference position of the mobile device. For example, the reference position may be determined from one or more of: a Global Navigation Satellite System, a WiFi based positioning system, a user supplied position, or any combination thereof.

At block 310, the device receives signals from a plurality of base transceiver stations (BTSs). For example, the signals may have properties such as received signal power level (e.g., RSSI), time delay (e.g., RTT), frequency, and/or delay-spread. The monitored signals may be used to determine a range measurement to each of the plurality of BTSs.

At block 315, the device determines one or more of: a position of the mobile device based on the received signals from the plurality of BTSs, a first position of the mobile device based on the received signals from the plurality of BTSs, a position range measurement with respect to of a target BTS, or a combination thereof. For example, position of the mobile device based on the received signals may be determined according triangulation from radio frequency range measurements from three or more BTSs within range of the mobile device. The radio frequency range measurements may include measurement of a time of arrival adjusted by clock bias (e.g., clock bias offset for a particular BTS may be received from a server). In one embodiment, a position of a target BTS may be obtained from a server. In some embodiments, the position of the target BTS may be centered at an antenna, main structural body, or other designated area of the BTS.

At block 320, the device detects one or more unreliable BTSs based on one or more of: a mobile device position measurement quality based on the reference position and the first position of the mobile device, a range measurement quality, or a combination thereof. For example, mobile device positioning measurement quality may indicates unreliable BTSs in response to determining a difference between the reference position of the mobile device and the position of the mobile device determined from BTS signals exceeds a threshold difference.

In one embodiment, range measurement quality may indicate an unreliable BTS in response to: measuring a range between the target BTS and the mobile device; determining, based on the reference position of the mobile device and the position of the target BTS, a reference distance between the mobile device and the target BTS; and determining a difference between the range and the reference distance is greater than a threshold difference (e.g., a range measurement quality threshold as described herein). In one embodiment, the threshold difference may be adaptive to the reference position uncertainty. For example the reference could be accurate by 10 meters, 100 meters or some other distance and therefore the respective thresholds may be adjusted. For example, the threshold may be adapted such as finalThreshold=defaultThreshold+refPosUncertainty. In one embodiment, the radio frequency derived distance is determined according to TOA at the mobile device and the mobile device translates the TOA into an estimated physical distance from a BTS to the mobile device.

At block 325, the device provides, in response to detecting the one or more unreliable BTS, a status report including one or more of: BTS data, mobile device data, or a combination thereof. For example, the status report may include one or more of: an identifier of at least one of the plurality of BTSs, the reference position of the mobile device, the BTS based position of the mobile device, corresponding measurements (e.g., TOA, TDOA, SNR), position estimator results (estimation residual error, list of BTSs), RAIM results, or any combination thereof. In some embodiments, the status report is referred to as including BTS data and mobile device data, and data associated with each respective source may be included in the status report under one of these two categories (either separately divided or mixed together).

In some embodiments, the mobile device ignores one or more of the unreliable BTSs for future mobile device positioning using BTSs. For example, the mobile device can determine an unreliable BTS should not be used for BTS positioning.

In some embodiments, the mobile device reduces or deactivates mobile device positioning using BTSs while in an unreliable positioning zone within a threshold range of the one or more unreliable BTSs. For example, each BTS may have an effective range for which mobile devices can utilize the BTS for positioning. The mobile device can determine the physical area covered by the effective range and bypass or ignore BTS signals from a particular problematic BTS while in the physical coverage area. In one embodiment, the mobile device can report the unreliable positioning zone to the server.

In some embodiments, the mobile device can increase a frequency of the monitoring of signals from the one or more unreliable BTSs when the mobile device is within range of the one or more unreliable BTSs. For example, if the mobile device is setup to be an active detector of BTS problems, the mobile device may proactively search for signals to provide further data or analysis to a positioning server.

In one embodiment, the mobile device requests updated assistance data from a server in response to providing the status report. For example, the server may be able to optimize the assistance data given any new information provided in a status report, therefore the mobile device may want to request receipt of any such updates.

Figure 3B:
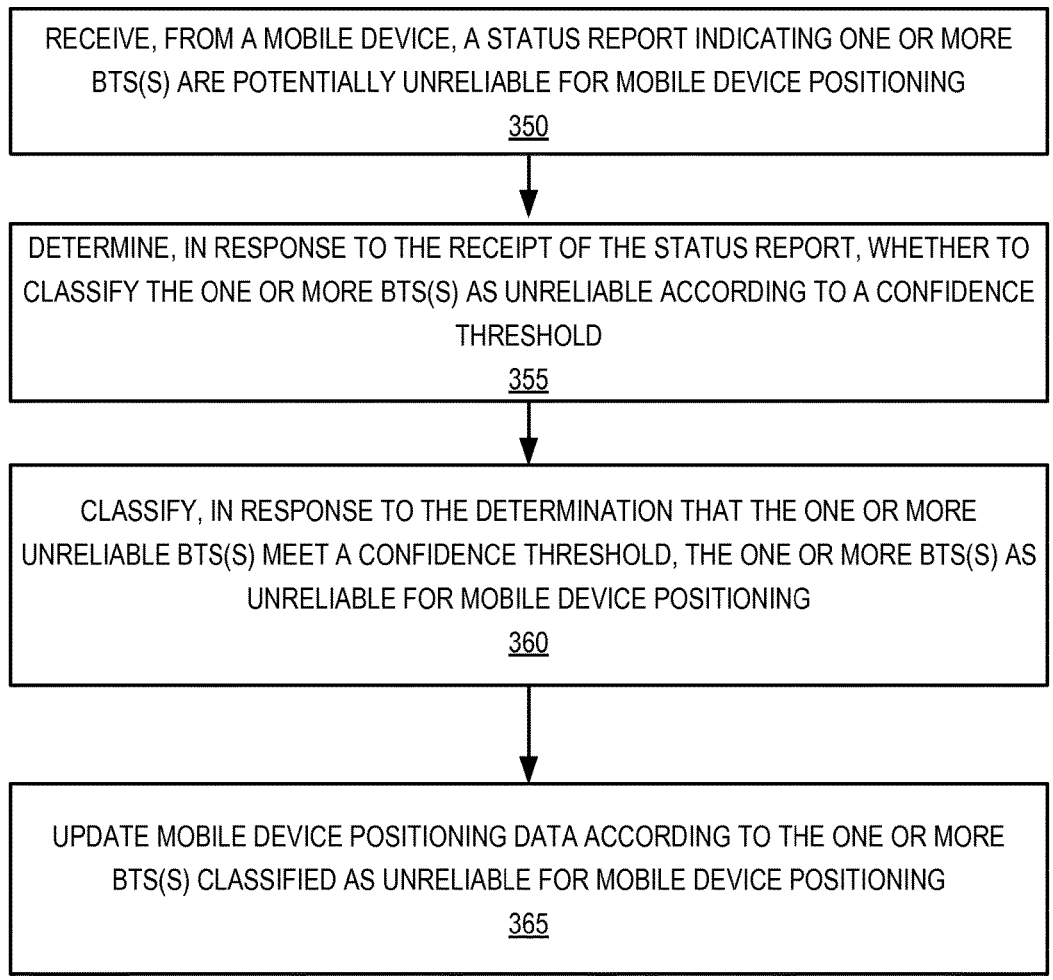
FIG. 3B is a flow diagram illustrating a method for a server to implement another embodiment of MPOR.

FIG. 3B is a flow diagram illustrating a method for a server to implement another embodiment of MPOR. At block 350, the server receives, from a mobile device, a status report indicating one or more BTSs are potentially unreliable for mobile device positioning.

At block 355, the server determines, in response to the receipt of the status report, whether to classify the one or more BTSs as unreliable according to a confidence threshold.

At block 360, the server classifies, in response to the determination that the one or more unreliable BTSs meet a confidence threshold, the one or more BTSs as unreliable for mobile device positioning. In one embodiment, the confidence threshold is determined from one or more of: a number of unique mobile devices that indicate a particular BTS as potentially unreliable, a previously calculated reliability rating for the one or more BTS s, an accuracy of a reference position used by each mobile device to indicate a particular BTS as potentially unreliable, or any combination thereof.

At block 365, the server updates mobile device positioning assistance data according to the one or more BTSs classified as unreliable for mobile device positioning. For example, the mobile device assistance data may be stored and organized within the server, or accessible by the server. In one embodiment, updating positioning assistance data includes one or more of: updating an unreliable positioning zone, in response to classifying one or more unreliable BTSs within the zone, removing the classified one or more unreliable BTSs from inclusion in the assistance data, referencing a mobile device positioning reliability rating for each BTS known to the server, flagging the classified one or more unreliable BTSs in the assistance data, or any combination thereof.

Figure 4:
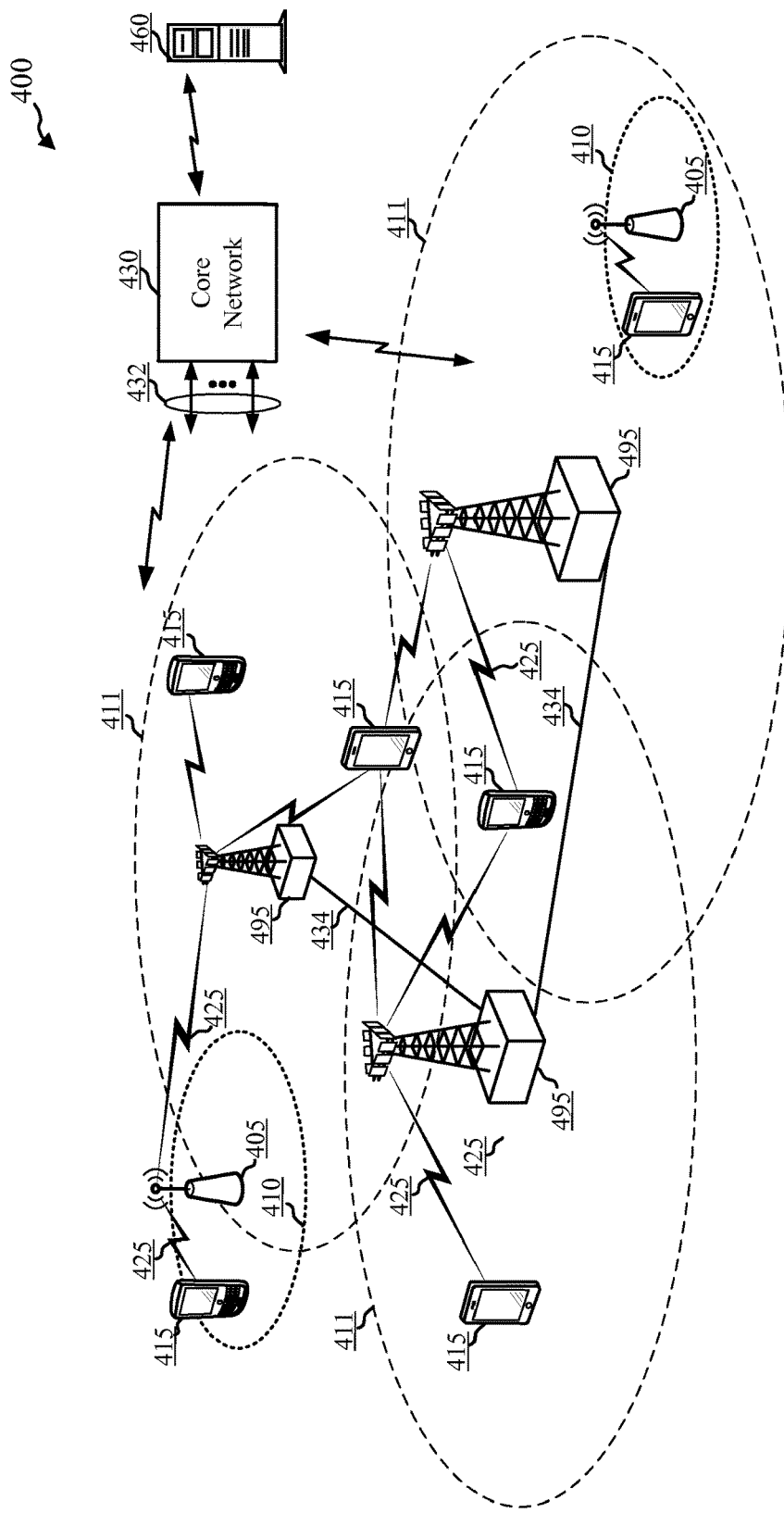
FIG. 4 is a diagram of an operating environment for providing MPOR, in one embodiment.

FIG. 4 illustrates a wireless communications operating environment for performing MPOR, in one embodiment. The system 400 includes a plurality of transmitters or access points including Wireless Local Area Network (WLAN) Access Point 405 and BTS 495. The system 400 may also include a server 460 (e.g., a positioning server), a number of devices 415 (e.g., which may be mobile devices in some embodiments), and a core network 430. Some of the access points 405 and BTS 495 may communicate with the mobile devices 415 under the control of the positioning server, which may be part of the core network 430 in various embodiments. Positioning requests may originate from mobile devices 415 and may be sent to the positioning server which may in turn send a request to an access point or BTS within range of the mobile device. Some of the access points 405 or BTS 495 may communicate control information and/or user data with the core network 430 through backhaul 432. In some embodiments, some of the access points 405 may communicate, either directly or indirectly, with each other over backhaul links 434, which may be wired or wireless communication links. The system 400 may support operation on multiple carriers (waveform signals of different frequencies). Multi-carrier transmitters can transmit modulated signals simultaneously on the multiple carriers. For example, each communication link 425 may be a multi-carrier signal modulated according to various radio technologies. Each modulated signal may be sent on a different carrier and may carry control information (e.g., reference signals, control channels, etc.), overhead information, data, etc.

The access points 405 and BTS 495 may wirelessly communicate with the mobile devices 415 via one or more antennas. Each of the WLAN Access Points 405 may provide communication coverage with respect to a respective geographic area 410. Each of the BTSs 495 may provide communication coverage with respect to a respective geographic area 411. In some embodiments, BTS 495 may include a base station antenna (BSA), a radio base station, or a radio transceiver. In some embodiments, BTS 495 may be referred to a NodeB, an evolved NodeB (eNB), a Home NodeB, a Home eNodeB, or other suitable systems. May represent different types of transceivers in different system, or may be called access points in an EVO system. The coverage area 410 for an access point may be divided into sectors making up only a portion of the coverage area (not shown). The system 400 may include BTS 495 of different types (e.g., macro, micro, and/or pico base stations). The BTS 495 may also utilize different radio technologies. The BTS 495 may be associated with the same or different access networks. The coverage areas of different BTS 495, including the coverage areas of the same or different types of BTS 495, utilizing the same or different radio technologies, and/or belonging to the same or different access networks, may overlap.

In some embodiments, the system 400 may include an LTE/LTE-A communications system (or network). In LTE/LTE-A communications systems, the term evolved Node B (eNB) may be generally used to describe one of the BTS 495 and the term user equipment (UE) may be generally used to describe one of the mobile devices 415. The system 400 may also be a Heterogeneous LTE/LTE-A network in which different types of eNBs provide coverage for various geographical regions. For example, each eNB may provide communication coverage for a macro cell, a pico cell, a femto cell, and/or other types of cell.

The core network 430 may communicate with the eNBs via a backhaul 432 (e.g., Si, etc.). The eNBs may also communicate with one another, e.g., directly or indirectly via backhaul links 434 (e.g., X2, etc.) and/or via backhaul 432 (e.g., through core network 430). The wireless communications system 400 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

Devices 415 may be dispersed throughout the wireless communications system 400, and each device 415 may be stationary or mobile. Device 415 may also be referred to by those skilled in the art as a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. Device 415 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. Device 415 may be able to communicate with macro eNBs, pico eNBs, femto eNBs, relays, and the like. Device 415 may also be able to communicate over different access networks, such as cellular, Wireless Wide Area Network (WWAN), or Wireless Local Area Network (WLAN).

The communication links 425 shown in system 400 may include uplinks for carrying uplink (UL) transmissions (e.g., from device 415 to a BTS 495) and/or downlinks (DLs) for carrying DL transmissions (e.g., from an BTS 495 to a device 415). The UL transmissions may also be called reverse link transmissions, while the DL transmissions may also be called forward link transmissions.

Device 415 can determine position based on network or mobile based positioning. In one embodiment, a mobile device determines its position based on a signal heatmap with signal measurement (e.g., RF signal classification or measurement). The signal heatmap may be created using RF parameters. RF positioning parameters may include statistics associated with received RF signal power at the determined location. RF parameters may be updated or refined, as devices collect additional RF characteristics or measurements. For example, RF parameters, used in generating a signal heatmap, may be updated or configured based on measurements of a RF signal or signals, between a mobile device and BTS 495. RF signal measurements may include received signal power level (e.g., RSSI), time delay (e.g., RTT), frequency, or delay-spread.

MPOR techniques described herein may be implemented as software, firmware, hardware, module, or engine of a mobile device (e.g., device 415) and/or server (positioning server 460). In some embodiments MPOR is performed by, or is integrated into both a mobile device and server.

Figure 5:
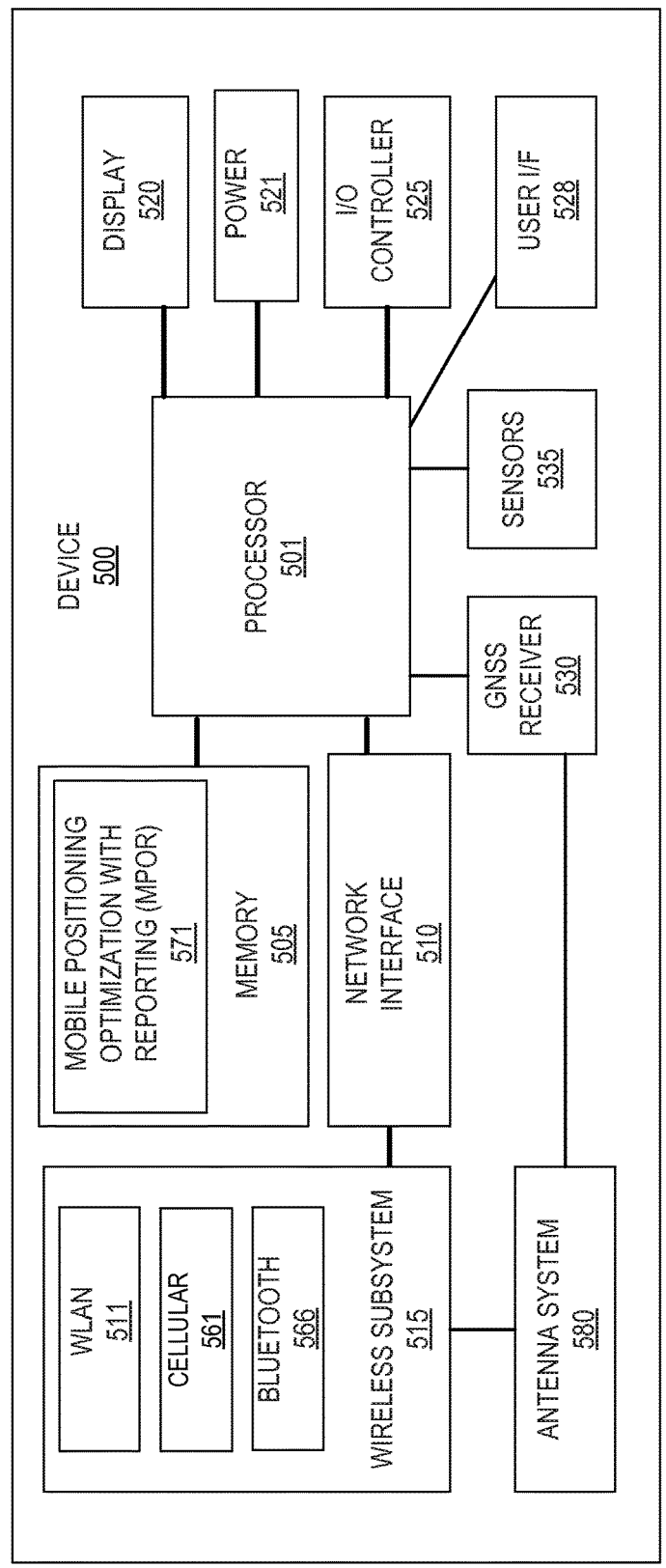
FIG. 5 is block diagram illustrating a device to perform MPOR, in one embodiment.

FIG. 5 is block diagram illustrating a device to perform MPOR, in one embodiment. In some embodiments, device 500 may be a server (e.g., positioning server 460), or a mobile device (e.g., mobile device 415).

Device 500 may include one or more processors 501 (e.g., a general purpose processor, specialized processor, or digital signal processor), a memory 505, I/O controller 525, and network interface 510. It should be appreciated that device 500 may also include a display 520, a user interface (I/F) 528 (e.g., keyboard, touch-screen, or similar devices), a power device 521 (e.g., a battery or power supply), as well as other components typically associated with electronic devices. In some embodiments, device 500 may be a mobile or non-mobile device.

The device 500 may also include a number of device sensors 535 coupled to one or more buses or signal lines further coupled to the processor(s) 501. The sensors 535 may include a clock, ambient light sensor (ALS), accelerometer, gyroscope, magnetometer, temperature sensor, barometric pressure sensor, red-green-blue (RGB) color sensor, ultra-violet (UV) sensor, UV-A sensor, UV-B sensor, compass, proximity sensor. The wireless device may also include a Global Positioning System (GPS) or GNSS receiver 530 which may enable GPS or GNSS measurements in support of A-GNSS positioning. In some embodiments, multiple cameras are integrated or accessible to the wireless device. In some embodiments, other sensors may also have multiple versions or types within a single wireless device.

Memory 505 may be coupled to processor 501 to store instructions (e.g., instructions to perform MPOR 571) for execution by processor 501. In some embodiments, memory 505 is non-transitory. Memory 505 may also store software or firmware instructions (e.g. for one or more programs or modules) to implement embodiments described herein such as MPOR embodiments described in association with FIGS. 1, 2, and 3. Thus, the memory 505 is a processor-readable memory and/or a computer-readable memory that stores software code (programming code, instructions, etc.) configured to cause the processor 501 to perform the functions described herein. Alternatively, one or more functions of MPOR may be performed in whole or in part in device hardware.

Memory 505 may also store data from integrated or external sensors. In addition, memory 505 may store application program interfaces (APIs) for providing access to one or more features of MPOR as described herein. In some embodiments, MPOR functionality can be implemented in memory 505. In other embodiments, MPOR functionality can be implemented as a module separate from other elements in the wireless device 500. The MPOR module may be wholly or partially implemented by other elements illustrated in FIG. 5, for example in the processor 501 and/or memory 505, or in one or more other elements of the device 500.

Network interface 510 may also be coupled to a number of wireless subsystems 515 (e.g., Bluetooth 566, WLAN 511, Cellular 561, or other networks) to transmit and receive data streams through a wireless antenna system 580 to/from a wireless network or through a wired interface for direct connection to networks (e.g., the Internet, Ethernet, or other wireline systems). Wireless subsystems 515 may be connected to antenna system 580. Antenna system 580 may be connected to GPS or GNSS receiver 530 to enable reception of GPS or other GNSS signals by GPS or GNSS receiver 530. Antenna system 580 may comprise a single antenna, multiple antennas and/or an antenna array and may include antennas dedicated to receiving and/or transmitting one type of signal (e.g. cellular, WiFi or GNSS signals) and/or may include antennas that are shared for transmission and/or reception of multiple types of signals. WLAN subsystem 511 may comprise suitable devices, hardware, and/or software for communicating with and/or detecting signals from WiFi APs and/or other wireless devices within a network (e.g. femtocells). In one aspect, WLAN subsystem 511 may comprise a WiFi (802.11x) communication system suitable for communicating with one or more wireless access points.

Cellular subsystem 561 may include one or more wide area network transceiver(s) that may be connected to one or more antennas in antenna system 580. The wide area network transceivers may comprise suitable devices, hardware, and/or software for communicating with and/or detecting signals to/from other wireless devices within a network. In one aspect, the wide area network transceivers may comprise a code division multiple access (CDMA) communication system suitable for communicating with a CDMA network of wireless base stations; however in other aspects, the wide area network transceivers may support communication with other cellular telephony networks or femtocells, such as, for example, time division multiple access (TDMA), Long-Term Evolution (LTE), Advanced LTE, Wideband Code Division Multiple Access (WCDMA), Universal Mobile Telecommunications System (UMTS), 4G, or Global System for Mobile Communications (GSM). Additionally, any other type of wireless networking technologies may be supported and used by wireless device 500, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT). Using AFLT, a server may compute a position for wireless device 500 from phase measurements made by device 500 of pilot signals transmitted from a plurality of base stations.

In one embodiment, device 500 implemented as a mobile device stores instructions (e.g., within memory 505) executable by processor 501 to determine a reference position, receive signals (e.g., via network interface 510) from BTSs, and determine mobile device position based on signals from the BTSs. Memory 505 may also store instructions to detect one or more unreliable BTSs based mobile device positioning measurement quality based on the plurality of BTSs and/or range measurement quality. Device 500 may also provide (e.g., via network interface 510 and wireless subsystem 515) a status report including BTS data and mobile device data.

In one embodiment, device 500 implemented as a server stores instructions (e.g., within memory 505) executable by processor 501 to receive (e.g., via network interface 510) a status report indicating BTS(s) are potentially unreliable. In one embodiment, device 500 implemented as a server also classifies BTS(s) as unreliable according to a threshold, and updates assistance data according to the classification.

The device as used herein (e.g., device 500) may be a: wireless device, cell phone, personal digital assistant, mobile computer, wearable device (e.g., watch, head mounted display, virtual reality glasses, etc.), tablet, personal computer, laptop computer, or any type of device that has wireless capabilities. As used herein, a wireless device may be any portable, or movable device or machine that is configurable to acquire wireless signals transmitted from, and transmit wireless signals to, one or more wireless communication devices or networks. Thus, by way of example but not limitation, the device 500 may include a radio device, a cellular telephone device, a computing device, a personal communication system device, or other like movable wireless communication equipped device, appliance, or machine. The term "device" is also intended to include devices which communicate with a personal navigation device, such as by short-range wireless, infrared, wireline connection, or other connection—regardless of whether satellite signal reception, assistance data reception, and/or position-related processing occurs at the device 500. Also, the term "device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the wireless device, at a server, or at another wireless device associated with the network. Any operable combination of the above can also be considered a "device" as used herein.

Other uses may also be possible. While various examples given in the description below relate to wireless devices, the techniques described herein can be applied to other devices.

The device may communicate wirelessly with a plurality of APs, base stations and/or femtocells using RF signals (e.g., 500 MHz, 1900 MHz, 2.4 GHz, 3.6 GHz, and 4.9/5.0 GHz bands) and standardized protocols for the modulation of the RF signals and the exchanging of information. For example, the protocol may be Institute of Electrical and Electronics Engineers (IEEE) 802.11x or 3GPP LTE. By extracting different types of information from the exchanged signals, and utilizing the layout of the network (i.e., the network geometry) the wireless device may determine its position within a predefined reference coordinate system.

It should be appreciated that embodiments of the invention as will be hereinafter described may be implemented through the execution of instructions, for example as stored in the memory 505 or other element, by processor 501 of device 500 and/or other circuitry of device 500 and/or other devices. Particularly, circuitry of device 500, including but not limited to processor 501, may operate under the control of a program, routine, or the execution of instructions to execute methods or processes in accordance with embodiments of the invention. For example, such a program may be implemented in firmware or software (e.g. stored in memory 505 and/or other locations) and may be implemented by processors, such as processor 501, and/or other circuitry of device 500. Further, it should be appreciated that the terms processor, microprocessor, circuitry, controller, etc., may refer to any type of logic or circuitry capable of executing logic, commands, instructions, software, firmware, functionality and the like.

Some or all of the functions, engines or modules described herein (e.g., MPOR features and methods illustrated in at least FIGS. 1-3) may be performed by the device 500 itself (e.g., via instructions of module 571 stored in memory 505). For example, processor 501 may execute instructions to measure signals from BTSs, determine measurement and positioning quality, and send status reports. In some embodiments or some or all of the functions, engines or modules described herein may be performed by another system connected through I/O controller 525 or network interface 510 (wirelessly or wired) to the device. Thus, some and/or all of the functions may be performed by another system and the results or intermediate calculations may be transferred back to the wireless device. In some embodiments, such other device may comprise a server configured to process information in real time or near real time. In some embodiments, the other device is configured to predetermine the results, for example based on a known configuration of the device. Further, one or more of the elements illustrated in FIG. 5 may be omitted from the device 500. For example, one or more of the sensors 535 may be omitted in some embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for position monitoring and reporting by a mobile device, the method comprising:
   determining a reference position of the mobile device utilizing a first positioning technique;
   receiving signals from a plurality of base transceiver stations (BTSs);
   determining a first position of the mobile device based on the received signals from the plurality of BTSs utilizing a second positioning technique;
   obtaining a mobile device positioning measurement quality based, at least in part, on a difference between the reference position and the first position of the mobile device;
   determining the mobile device positioning measurement quality is indicative of one or more unreliable BTSs based, at least in part, on a determination that the difference between the reference position and the first position of the mobile device exceeds a first threshold difference, wherein the first threshold difference is a configurable threshold that is configured based, at least in part, on an uncertainty associated with the reference position determined using the first positioning technique; and
   providing to a server, in response to determining the mobile device positioning measurement quality is indicative of the one or more unreliable BTSs, a status report including one or more of: BTS data, mobile device data, or a combination thereof.

2. The method of claim 1, wherein determining the mobile device positioning measurement quality is indicative of one or more unreliable BTSs comprises:
   measuring a range between a target BTS and the mobile device;
   determining, based on the reference position of the mobile device and a position of the target BTS, a reference range between the mobile device and the target BTS; and
   determining whether a difference between the measured range and the reference range is greater than a second threshold difference.

3. The method of claim 1, wherein:
   the BTS data includes one or more of: an identifier of at least one of the plurality of BTS, a measured range between a target BTS and the mobile device, or combinations thereof; and
   the mobile device data includes one or more of: the reference position of the mobile device, the first position of the mobile device based on the received signals from the plurality of BTSs, or combinations thereof.

4. The method of claim 1, wherein the reference position is determined at least in part from one or more of:
   a Global Navigation Satellite System,
   a WiFi based positioning system,
   a user supplied position,
   sensor based position,
   or any combination thereof.

5. The method of claim 1, further comprising one or more of:
   excluding one or more of the unreliable BTSs from future mobile device positioning using BTSs,
   reducing or deactivating mobile device positioning using BTSs while in an unreliable positioning zone within a threshold range of the one or more unreliable BTSs,
   reporting the unreliable positioning zone to the server,
   increasing a frequency of monitoring of signals from the one or more unreliable BTSs when the mobile device is within range of the one or more unreliable BTSs,
   requesting updated assistance data from a server in response to providing the status report, or
   any combination thereof.

6. The method of claim 1, wherein determining the first position of the mobile device based on the received signals from the plurality of BTSs is triggered in response to one or more of:
   the determining of the reference position,
   a self-determination by the mobile device that signals from BTS may be unreliable,
   a user request to verify accuracy of the first position of the mobile device based on the received signals from the plurality of BTSs,
   a server request to verify accuracy of the first position of the mobile device based on the received signals from the plurality of BTSs, or
   any combination thereof.

7. The method of claim 1, further comprising:
   receiving, from a server, updated assistance data in response to providing the status report.

8. The method of claim 1, wherein the first positioning technique is performed for a purpose other than determining the mobile device positioning measurement quality is indicative of one or more unreliable BTSs, and wherein the reference position and the first position are used for determining if the first threshold is exceeded when a difference between a time associated with the determination of the reference position and a time associated with the determination of the first position is below a time difference threshold.

9. The method of claim 8, wherein a value of the time difference threshold is based, at least in part, on movement of the mobile device.

10. A mobile device for position monitoring and reporting comprising:
   a memory;
   a processor coupled to the memory and configured to:
      determine a reference position of the mobile device utilizing a first positioning technique;
      receive signals from a plurality of base transceiver stations (BTSs);
      determine a first position of the mobile device based on the received signals from the plurality of BTSs utilizing a second positioning technique;
      obtain a mobile device positioning measurement quality based, at least in part, on a difference between the reference position and the first position of the mobile device;
      determine the mobile device positioning measurement quality is indicative of one or more unreliable BTSs based, at least in part, on a determination that the difference between the reference position and the first position of the mobile device exceeds a first threshold difference, wherein the first threshold difference is a configurable threshold that is configured based, at least in part, on an uncertainty associated with the reference position determined using the first positioning technique; and
      provide to a server, in response to determining the mobile device positioning measurement quality is indicative of the one or more unreliable BTSs, a status report including one or more of: BTS data, mobile device data, or a combination thereof.

11. The mobile device of claim 10, wherein the processor configured to determine the mobile device positioning measurement quality is indicative of one or more unreliable BTSs is configured to:
   measure a range between a target BTS and the mobile device;
   determine, based on the reference position of the mobile device and a position of the target BTS, a reference range between the mobile device and the target BTS; and
   determine whether a difference between the measured range and the reference range is greater than a second threshold difference.

12. The mobile device of claim 10, wherein:
   the BTS data includes one or more of: an identifier of at least one of the plurality of BTS, a measured range between a target BTS and the mobile device, or combinations thereof; and
   the mobile device data includes one or more of: the reference position of the mobile device, the first position of the mobile device based on the received signals from the plurality of BTSs, or combinations thereof.

13. The mobile device of claim 10, wherein the reference position is determined at least in part from one or more of:
   a Global Navigation Satellite System,
   a WiFi based positioning system,
   a user supplied position,
   sensor based position,
   or any combination thereof.

14. The mobile device of claim 10, further comprising one or more instructions to:
   exclude one or more of the unreliable BTSs from future mobile device positioning using BTSs,
   reduce or deactivating mobile device positioning using BTSs while in an unreliable positioning zone within a threshold range of the one or more unreliable BTSs,
   report the unreliable positioning zone to the server,
   increase a frequency of monitoring of signals from the one or more unreliable BTSs when the mobile device is within range of the one or more unreliable BTSs,
   request updated assistance data from a server in response to providing the status report, or
   any combination thereof.

15. The mobile device of claim 10, wherein determining the first position of the mobile device based on the received signals from the plurality of BTSs is triggered in response to one or more of:
   the determining of the reference position,
   a self-determination by the mobile device that signals from BTS may be unreliable,
   a user request to verify accuracy of the first position of the mobile device based on the received signals from the plurality of BTSs,
   a server request to verify accuracy of the first position of the mobile device based on the received signals from the plurality of BTSs, or
   any combination thereof.

16. The mobile device of claim 10, further comprising instructions to:
   receive, from a server, updated assistance data in response to providing the status report.

17. A machine readable non-transitory storage medium having stored therein program instructions that are executable by a processor to:
   determine a reference position of a mobile device utilizing a first positioning technique;
   receive signals from a plurality of base transceiver stations (BTSs);
   determine a first position of the mobile device based on the received signals from the plurality of BTSs utilizing a second positioning technique;

obtain a mobile device positioning measurement quality based, at least in part, on a difference between the reference position and the first position of the mobile device;
determine the mobile device positioning measurement quality is indicative of one or more unreliable BTSs based, at least in part, on a determination that the difference between the reference position and the first position of the mobile device exceeds a first threshold difference, wherein the first threshold difference is a configurable threshold that is configured based, at least in part, on an uncertainty associated with the reference position determined using the first positioning technique; and
provide to a server, in response to determining the mobile device positioning measurement quality is indicative of the one or more unreliable BTSs, a status report including one or more of: BTS data, mobile device data, or a combination thereof.

18. The medium of claim 17, wherein the instructions to determine the mobile device positioning measurement quality is indicative of one or more unreliable BTSs comprises instructions to:
measure a range between a target BTS and the mobile device;
determine, based on the reference position of the mobile device and a position of the target BTS, a reference range between the mobile device and the target BTS; and
determine whether a difference between the measured range and the reference range is greater than a second threshold difference.

19. The medium of claim 17, wherein:
the BTS data includes one or more of: an identifier of at least one of the plurality of BTS, a measured range between a target BTS and the mobile device, or combinations thereof; and
the mobile device data includes one or more of: the reference position of the mobile device, the first position of the mobile device based on the received signals from the plurality of BTSs, or combinations thereof.

20. The medium of claim 17, wherein the reference position is determined at least in part from one or more of:
a Global Navigation Satellite System,
a WiFi based positioning system,
a user supplied position,
sensor based position,
or any combination thereof.

21. The medium of claim 17, further comprising one or more instructions to:
exclude one or more of the unreliable BTSs from future mobile device positioning using BTSs,
reduce or deactivating mobile device positioning using BTSs while in an unreliable positioning zone within a threshold range of the one or more unreliable BTSs,
report the unreliable positioning zone to the server,
increase a frequency of monitoring of signals from the one or more unreliable BTSs when the mobile device is within range of the one or more unreliable BTSs,
request updated assistance data from a server in response to providing the status report, or
any combination thereof.

22. The medium of claim 17, wherein the instructions to determine the first position of the mobile device based on the received signals from the plurality of BTSs are triggered in response to one or more of:
the determining of the reference position,
a self-determination by the mobile device that signals from BTS may be unreliable,
a user request to verify accuracy of the first position of the mobile device based on the received signals from the plurality of BTSs,
a server request to verify accuracy of the first position of the mobile device based on the received signals from the plurality of BTSs, or
any combination thereof.

23. The medium of claim 17, further comprising instructions to:
receive, from a server, updated assistance data in response to providing the status report.

24. An apparatus for position monitoring and reporting by of a mobile device, the apparatus comprising:
means for determining a reference position of the mobile device utilizing a first positioning technique;
means for receiving signals from a plurality of base transceiver stations (BTSs);
means for determining a first position of the mobile device based on the received signals from the plurality of BTSs utilizing a second positioning technique;
means for obtaining a mobile device positioning measurement quality based, at least in part, on a difference between the reference position and the first position of the mobile device;
means for determining the mobile device positioning measurement quality is indicative of one or more unreliable BTSs based, at least in part, on a determination that the difference between the reference position and the first position of the mobile device exceeds a first threshold difference, wherein the first threshold difference is a configurable threshold that is configured based, at least in part, on an uncertainty associated with the reference position determined using the first positioning technique; and
means for providing to a server, in response to determining the mobile device positioning measurement quality is indicative of the one or more unreliable BTSs, a status report including one or more of: BTS data, mobile device data, or a combination thereof.

25. The apparatus of claim 24, wherein the means for determining the mobile device positioning measurement quality is indicative of one or more unreliable BTSs comprises:
means for determining whether the difference between the reference position of the mobile device and the first position of the mobile device exceeds a first threshold difference;
means for measuring a range between a target BTS and the mobile device;
means for determining, based on the reference position of the mobile device and a position of the target BTS, a reference range between the mobile device and the target BTS; and
means for determining whether a difference between the measured range and the reference range is greater than a second threshold difference.

26. The apparatus of claim 24, wherein:
the BTS data includes one or more of: an identifier of at least one of the plurality of BTS, a measured range between a target BTS and the mobile device, or combinations thereof; and
the mobile device data includes one or more of: the reference position of the mobile device, the first position of the mobile device based on the received signals from the plurality of BTSs, or combinations thereof.

27. The apparatus of claim 24, wherein the reference position is determined at least in part from one or more of:
- a Global Navigation Satellite System,
- a WiFi based positioning system,
- a user supplied position,
- sensor based position,
- or any combination thereof.

28. The apparatus of claim 24, further comprising one or more of:
- means for excluding one or more of the unreliable BTSs from future mobile device positioning using BTSs,
- means for reducing or deactivating mobile device positioning using BTSs while in an unreliable positioning zone within a threshold range of the one or more unreliable BTSs,
- means for reporting the unreliable positioning zone to the server,
- means for increasing a frequency of monitoring of signals from the one or more unreliable BTSs when the mobile device is within range of the one or more unreliable BTSs,
- means for requesting updated assistance data from a server in response to providing the status report, or
- any combination thereof.

29. The apparatus of claim 24, wherein the means for determining the first position of the mobile device based on the received signals from the plurality of BTSs is triggered in response to one or more of:
- the determining of the reference position,
- a self-determination by the mobile device that signals from BTS may be unreliable,
- a user request to verify accuracy of the first position of the mobile device based on the received signals from the plurality of BTSs,
- a server request to verify accuracy of the first position of the mobile device based on the received signals from the plurality of BTSs, or
- any combination thereof.

30. A method to provide positioning assistance data, the method comprising:
- receiving, from a mobile device, a status report indicating one or more BTSs are potentially unreliable for mobile device positioning;
- determining, in response to receiving the status report, whether to classify the one or more BTSs as unreliable according to a confidence threshold;
- classifying, in response to determining the one or more unreliable BTSs meet a confidence threshold, the one or more BTSs as unreliable for mobile device positioning;
- identifying an unreliable positioning zone, based on a plurality of status reports received from a plurality of mobile devices, when a threshold number of positioning problems are reported for BTSs located within the unreliable positioning zone; and
- updating assistance data according to the one or more BTSs classified as unreliable for mobile device positioning, wherein updating assistance data comprises updating the unreliable positioning zone to include at least one of the one or more BTSs located within the unreliable positioning zone that was classified as unreliable, wherein the updated assistance data identifies the unreliable positioning zone and unreliable BTSs located within the unreliable positioning zone to one or more mobile devices that receive the updated assistance data.

31. The method of claim 30, wherein the status report comprises one or more of:
- an identifier of at least one of the one or more BTSs,
- a reference position of the mobile device,
- a position of the mobile device determined from the one or more BTSs,
- a range measurement based distance between the one or more BTSs and the mobile device, or
- any combination thereof.

32. The method of claim 30, wherein the confidence threshold is determined from one or more of:
- a number of unique mobile devices that indicate a particular BTS as potentially unreliable,
- a previously calculated reliability rating for the one or more BTSs,
- an accuracy of a reference position used by each mobile device to indicate a particular BTS as potentially unreliable, or
- any combination thereof.

33. The method of claim 30, wherein updating assistance data comprises one or more of:
- removing the classified one or more unreliable BTSs from inclusion in the assistance data,
- referencing a mobile device positioning reliability rating for each known BTS,
- flagging the classified one or more unreliable BTSs in the assistance data, or
- any combination thereof.

34. A server to provide positioning assistance data, the server comprising:
- a memory;
- a processor coupled to the memory and configured to:
  - receive, from a mobile device, a status report indicating one or more BTSs are potentially unreliable for mobile device positioning;
  - determine, in response to the receipt of the status report, whether to classify the one or more BTSs as unreliable according to a confidence threshold;
  - classify, in response to the determination that the one or more unreliable BTSs meet a confidence threshold, the one or more BTSs as unreliable for mobile device positioning;
  - identifying an unreliable positioning zone, based on a plurality of status reports received from a plurality of mobile devices, when a threshold number of positioning problems are reported for BTSs located within the unreliable positioning zone; and
  - update assistance data according to the one or more BTSs classified as unreliable for mobile device positioning, wherein updating assistance data comprises updating an unreliable positioning zone to include at least one of the one or more BTSs located within the unreliable positioning zone that was classified as unreliable, wherein the updated assistance data identifies the unreliable positioning zone and unreliable BTSs located within the unreliable positioning zone to one or more mobile devices that receive the updated assistance data.

35. The server of claim 34, wherein the status report comprises one or more of:
- an identifier of at least one of the one or more BTSs,
- a reference position of the mobile device,
- a position of the mobile device determined from the one or more BTSs,
- a range measurement based distance between the one or more BTSs and the mobile device, or
- any combination thereof.

36. The server of claim 34, wherein the confidence threshold is determined from one or more of:
- a number of unique mobile devices that indicate a particular BTS as potentially unreliable,
- a previously calculated reliability rating for the one or more BTSs,
- an accuracy of a reference position used by each mobile device to indicate a particular BTS as potentially unreliable, or
- any combination thereof.

37. The server of claim 34, wherein instructions for updating assistance data comprises one or more instructions to:
- remove the classified one or more unreliable BTSs from inclusion in the assistance data,
- reference a mobile device positioning reliability rating for each known BTS,
- flag the classified one or more unreliable BTSs in the assistance data, or
- any combination thereof.

* * * * *